US009298607B2

(12) United States Patent
Zimmer et al.

(10) Patent No.: US 9,298,607 B2
(45) Date of Patent: Mar. 29, 2016

(54) ACCESS CONTROL FOR NON-VOLATILE RANDOM ACCESS MEMORY ACROSS PLATFORM AGENTS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 13/997,943

(22) PCT Filed: Nov. 22, 2011

(86) PCT No.: PCT/US2011/061921
§ 371 (c)(1),
(2), (4) Date: Jun. 25, 2013

(87) PCT Pub. No.: WO2013/077867
PCT Pub. Date: May 30, 2013

(65) Prior Publication Data
US 2013/0304979 A1   Nov. 14, 2013

(51) Int. Cl.
*G06F 12/02* (2006.01)
*G06F 13/14* (2006.01)
*G06F 13/16* (2006.01)

(52) U.S. Cl.
CPC ............ *G06F 12/0246* (2013.01); *G06F 13/14* (2013.01); *G06F 13/16* (2013.01)

(58) Field of Classification Search
CPC ..... G06F 12/00; G06F 12/0246; G06F 13/14; G06F 13/16; G06F 3/1423; G06F 3/0688; G11C 14/0018; G11C 16/00
See application file for complete search history.

(56) References Cited

U.S. PATENT DOCUMENTS

| 5,912,839 | A  | 6/1999  | Ovshinsky et al. |
| 7,590,918 | B2 | 9/2009  | Parkinson |
| 7,600,078 | B1 | 10/2009 | Cen et al. |
| 7,756,053 | B2 | 7/2010  | Thomas et al. |

(Continued)

FOREIGN PATENT DOCUMENTS

| CN | 102035651 A | 4/2011 |
| TW | 200736908 A | 10/2007 |
| TW | 201140334 A | 11/2011 |

OTHER PUBLICATIONS

International Preliminary Report on Patentability for International Application No. PCT/US2011/061921, mailed Jun. 5, 2014, 6 pages.

(Continued)

*Primary Examiner* — Hashem Farrokh
(74) *Attorney, Agent, or Firm* — Blakely, Sokoloff, Taylor & Zafman LLP

(57) ABSTRACT

A controller is used in a computer system to control access to an NVRAM. The computer system includes a processor coupled to a non-volatile random access memory (NVRAM). The NVRAM is byte-rewritable and byte-erasable. The NVRAM stores data to be used by a set of agents including in-band agents and an out-of-band agent. The in-band agents run on a processor having one or more cores, and the out-of-band agent that runs on a non-host processing element. When the controller receives an access request from the out-of-band agent, the controller determines, based on attributes associated with the out-of-band agent, whether a region in the NVRAM is shareable by the out-of-band agent and at least one of the in-band agents.

21 Claims, 5 Drawing Sheets

(56) References Cited

U.S. PATENT DOCUMENTS

| | | | |
|---|---|---|---|
| 7,913,147 B2 | 3/2011 | Swaminathan et al. | |
| 8,156,306 B1* | 4/2012 | Raizen et al. | 711/202 |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,605,531 B2 | 12/2013 | Kau et al. | |
| 8,607,089 B2 | 12/2013 | Qawami et al. | |
| 8,612,676 B2 | 12/2013 | Dahlen et al. | |
| 8,612,809 B2 | 12/2013 | Casper et al. | |
| 8,635,705 B2 | 1/2014 | Sahita et al. | |
| 8,649,212 B2 | 2/2014 | Kau et al. | |
| 8,838,935 B2 | 9/2014 | Hinton | |
| 2002/0095595 A1* | 7/2002 | Christopherson | H04L 67/42 726/4 |
| 2002/0129212 A1 | 9/2002 | Lee et al. | |
| 2006/0117177 A1* | 6/2006 | Buer | 713/155 |
| 2007/0005922 A1 | 1/2007 | Swaninathan et al. | |
| 2007/0174850 A1* | 7/2007 | El Zur | 719/321 |
| 2007/0260813 A1 | 11/2007 | Lin | |
| 2008/0028128 A1 | 1/2008 | Rueping | |
| 2008/0034148 A1 | 2/2008 | Gower | |
| 2008/0244212 A1* | 10/2008 | Rothman et al. | 711/172 |
| 2008/0263086 A1* | 10/2008 | Klemba et al. | 707/103 R |
| 2008/0270811 A1 | 10/2008 | Chow et al. | |
| 2009/0313416 A1 | 12/2009 | Nation | |
| 2010/0030981 A1 | 2/2010 | Cook | |
| 2010/0131827 A1 | 5/2010 | Sokolov | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0153916 A1 | 6/2011 | Chinnaswamy et al. | |
| 2011/0197018 A1* | 8/2011 | Noh et al. | 711/103 |
| 2011/0291884 A1 | 12/2011 | Oh et al. | |
| 2013/0282967 A1 | 10/2013 | Ramanujan | |
| 2014/0075107 A1 | 3/2014 | Qawami et al. | |

OTHER PUBLICATIONS

PCT International Search Report mailed Jul. 30, 2012 for PCT Application No. PCT/US2011/061921, filed Nov. 22, 2011, 3 pages.

PCT Written Opinion of the International Searching Authority mailed Jul. 30, 2012 for PCT Application No. PCT/US2011/061921, filed Nov. 22, 2011, 4 pages.

Lee et al., "Architecting Phase Change Memory as a Scalable DRAM Alternative", ISCA '09, Jun. 20, 2009, 12 pgs., Austin, Texas, USA.

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

First Office Action in counter part Chinese Patent Application no. 201180074963.0, mailed Dec. 3, 2015, 5 pages. (Page 4 English translation of Prior Art).

* cited by examiner

ACCESS CONTROL FOR NON-VOLATILE RANDOM ACCESS MEMORY ACROSS PLATFORM AGENTS

CROSS-REFERENCE TO RELATED APPLICATION

This patent application is a U.S. National Phase Application under 35 U.S.C. §371 of International Application No. PCT/US2011/061921, filed Nov. 22, 2011, entitled ACCESS CONTROL FOR NON-VOLATILE RANDOM ACCESS MEMORY ACROSS PLATFORM AGENTS.

BACKGROUND

1. Field of the Invention

Embodiments of the invention relate generally to the field of computer systems. More particularly, embodiments of the invention relate to an access control mechanism for non-volatile random access memory in a computer system.

2. Description of the Related Art

In conventional computer systems, system memory (also known as main memory, primary memory, executable memory) is typically implemented by dynamic random access memory (DRAM). DRAM-based memory consumes power even when no memory reads or writes occur because it constantly recharges internal capacitors. DRAM-based memory is volatile, which means data stored in DRAM memory is lost once the power is removed. For many computer systems, especially mobile platforms, power utilization is a critical issue in terms of cost and performance.

Phase-change memory (PCM), also sometimes referred to as phase change random access memory (PRAM or PCRAM), PCME, Ovonic Unified Memory, or Chalcogenide RAM (C-RAM), is a type of non-volatile computer memory which exploits the unique behavior of chalcogenide glass. As a result of heat produced by the passage of an electric current, chalcogenide glass can be switched between two states: crystalline and amorphous. Recent versions of PCM can achieve two additional distinct states. As a result, storage density and capacity are significantly increased.

PCM provides higher performance than flash memory (also referred to as "flash") because the memory element of PCM can be switched more quickly, writing (changing individual bits to either 1 or 0) can be done without the need to first erase an entire block of cells, and degradation from writes is slower (a PCM device may survive approximately 100 million write cycles; PCM degradation is due to thermal expansion during programming, metal (and other material) migration, and other mechanisms).

BRIEF DESCRIPTION OF THE DRAWINGS

The following description and accompanying drawings are used to illustrate embodiments of the invention. In the drawings.

DETAILED DESCRIPTION

Figure 1:
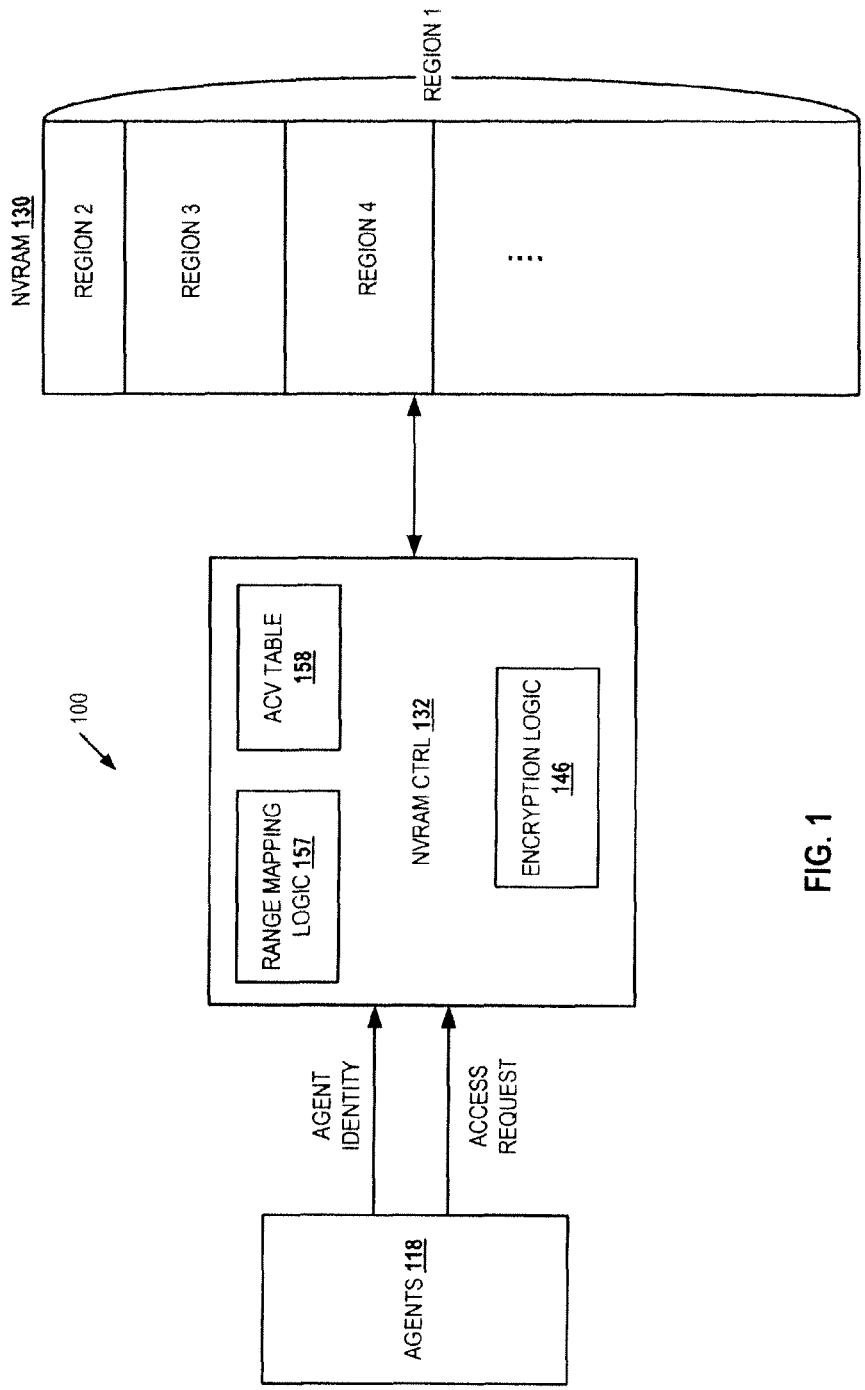
FIG. 1 illustrates an access control mechanism for a non-volatile random access memory (NVRAM) according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

Embodiments of the invention protect crucial data stored in a memory device while allowing multiple different agents to access the same memory device. In some embodiments, this memory device is implemented by non-volatile random access memory (NVRAM), such as Phase Change memory (PCM), PCM with switch (PCMS), or related memory technologies. Embodiments of the invention provide agent-specific access control, such that a designated NVRAM region is made accessible to an agent based on the agent's identity. For example, a high-privileged agent (e.g., the core microcode that runs on the processor) can access the entire NVRAM, while a low-privileged agent (e.g., an application that runs on the processor) can only access a portion of the NVRAM. Based on a configurable access control vector (ACV), an agent can have exclusive or shared access to a designated NVRAM region. An NVRAM region which is accessible by an agent is referred to as a region "owned" by that agent. Exclusive access allows an agent to safeguard the data in the region that it owns, preventing another agent (which may be a third party agent) from modifying the data stored in that region. For example, the data stored in a microcode-owned region can be microcode patches, which contains proprietary information that a microcode developer would want to protect from third parties. By designating the region storing the microcode patches as not-shareable, other agents (e.g., the operating system (OS)) would be unable to access the proprietary information.

In a conventional computer system, exclusive access is typically enforced by using separate memory devices for different agents; e.g., the Basic Input/Output System (BIOS) uses a flash memory device, management engine (ME) uses another flash memory device, and the OS uses a dynamic random access memory (DRAM). For system integration and cost reduction, it is beneficial for these agents to use the same memory device that has sufficient capacity to accommodate all of the agents' data. However, in a typical computer system, the core microcode can be developed by the processor manufacturer, while some of the boot firmware, OS, and applications, etc., can be provided by one or more third party vendors. For them to use the same memory device can create data security issues. To isolate platform code from third party extension code, embodiments of the invention provide an access control mechanism for controlling access to this common memory device. In one embodiment, this common memory device is NVRAM (e.g., PCMS), and the access control mechanism is performed by a controller coupled to the NVRAM. The computer system can be a server computer or a mobile computing system.

Embodiments of the invention also allow shared access to an NVRAM region, such that critical data stored by one agent in an NVRAM region can be shared by another agent. The shared access can be beneficial for diagnostics and error recovery. For example, an NVRAM region can be used to store the data that is used by the core microcode in the system boot process. This NVRAM region can be designated as "shareable" between the core microcode and the ME. In one embodiment, the ME is a microcontroller that can operate even when the processor cores are inoperable. If the content of this shared region is compromised such that the core microcode is rendered inoperable, the ME can access the compromised content and update or recover the content. As another example, a baseboard management controller (BMC) and the BIOS can share access to the same NVRAM region that stores BIOS image updates used for booting the platform. If the BIOS image updates are compromised or otherwise rendered inoperable, the BMC can remotely update the compromised image to resolve any erroneous conditions and allow the platform to boot.

The term "agent" herein refers to a hardware, software, or firmware entity that is capable of accessing the data stored in an NVRAM of a computer system. An agent can be an in-band agent or an out-of-band agent. An in-band agent runs on the processor cores ("cores"). An out-of-band agent runs on a non-host processing element (e.g., a microcontroller that is not one of the cores and can operate independently of the cores), and can communicate through a network interface with a system administrator or a remote server. In the description above, the OS, core microcode, and BIOS are examples of in-band agents; the ME and the BMC are examples of out-of-band agents. Embodiments of the invention allow an NVRAM region to be shared by two or more agents; e.g., an in-band agent and an out-of-band agent, such that errors in an NVRAM region owned by the in-band agent can be resolved by the out-of-band agent, since the microcontroller running the out-of-band agent can operate independently of the cores that run the in-band agent.

FIG. 1 is a high-level block diagram illustrating selected aspects of a computer system 100 in which embodiments of the invention can operate. In one embodiment, computer system 100 includes a number of agents (e.g., agents 118). Agents 118 can include any number of in-band agents and any number of one out-of-band agents. Examples of an in-band agent include, but are not limited to, core microcode, CPU/chipset state machines, boot firmware, BIOS, operating systems, hypervisors, user-domain processes/applications, OS guests, and system management mode (SMM) operations. Some of these in-band agents can be treated as having the same agent type and are identified by the same agent identity; e.g., microcode and CPU/chipset state machines can be identified as Agent A, boot firmware and BIOS can be identified as Agent B, operating systems and hypervisors can be identified as Agent C, user-domain processes/applications and OS guests can be identified as Agent D, and SSM operations can be identified as Agent E. An in-band agent runs on one or more the cores. Examples of an out-of-band agent include, but are not limited to, BMC, ME, service processor, security engine, and system control unit. An out-of-band agent runs on a non-host processing element (e.g., a microcontroller) that can be located on the processor die, on the CPU package, on a chipset coupled to the processor die, or on a baseboard coupled to the processor package. The microcontroller can operate independently of the cores; that is, the microcontroller can continue to perform its function even if the cores fail to operate properly.

In one embodiment, agents 118 are coupled to an NVRAM controller 132 that performs an access control function for an NVRAM 130. NVRAM 130 can be partitioned into a number of regions, with each region accessible by one or more of agents 118. Some of the regions (e.g., region 1 and the other regions) can be overlapping and some (e.g., region 2 and region 3) are not. In the example of FIG. 1, region 1 may be accessible by Agent A, region 2 by Agent B, region 3 by Agent C, etc. In one embodiment, NVRAM 130 is coupled to a range mapping logic 157. When one of agents 118 attempts to access data in NVRAM 130, the agent asserts an agent identity to NVRAM controller 132. Range mapping logic 157 decodes the agent identity to determine which NVRAM region is accessible to the requesting agent.

In one embodiment, range mapping logic 157 performs range mapping by consulting an access control vector (ACV) table 158. In one embodiment, ACV table 158 is stored in an internal memory of NVRAM controller 132. Alternatively, ACV table 158 may be stored outside of NVRAM controller 132 and accessible by the NVRAM controller 132. Each entry in ACV table 158 is an N-tuple vector (referred to as an ACV) that describes the attributes associated with an agent identity. For example, an ACV can include (Agent identity, Read (Y/N), Write (Y/N), Executable (Y/N), Range Base, Range Length, Encryption (Y/N), Shareable (Y/N), Lock (YIN)). Alternative embodiments of the ACV may include more or fewer attributes. For example, an ACV having the attributes of (Agent A, Y, N, Y, Addr, Len, Y, Y, Y) indicates that the NVRAM region in the address range (Addr, Addr+Len) is read-only and executable by Agent A, requires encryption prior to storing data therein, is shareable with other agents (e.g., an out-of-band agent such as the BMC or ME), and is locked from write access by other agents.

In one embodiment, the agent identity is a unique identifier that identifies an agent. For in-band agents, this unique identifier can be the agent's type (e.g., Agent A-E). For an out-of-band agent, this unique identifier can be a bus address (e.g., a serial peripheral interface (SPI) bus), which can be passed to NVRAM controller 132 with the agent's access request by a platform controller hub (PCH) (not shown) in the I/O subsystem of computer system 100. In one embodiment, the attribute "shareable" can further indicate whether it is read shareable, write shareable, or a combination of both. In one embodiment, the attribute "Lock" can further indicate whether an NVRAM region can be permanently locked or non-permanently locked. A permanent lock, once locked, stays locked across power cycles. A non-permanent lock can be reset (i.e., unlocked) whenever the system is reset.

In one embodiment, NVRAM controller 132 is also coupled to an encryption logic 146 that encrypts data before being stored into NVRAM 130. Encryption prevents unauthorized access by malicious parties. For example, a malicious party may lift the lid off an NVRAM package integrated on the processor package, de-solder the NVRAM package from a system board, or remove the NVRAM dual inline memory module (DIMM) from the system. Encrypting the NVRAM contents prevents malicious parties from launching a Cyber 9-1-1 or day-0 attack on the platform hardware. In one embodiment, encryption can be optional. The attribute "Encryption" in an ACV indicates whether the data stored in an NVRAM region is encrypted.

In one embodiment, ACV table 158 can be implemented by RAM or other high-speed programmable memory. Agents 118 can have different privilege levels. An agent with a high privilege (e.g., the core microcode) can configure ACV table 158 when computer system 100 starts up for the first time. To configure ACV table 158, an agent needs to prove its identity to NVRAM controller 132 by providing its credential. The credential can be a secret key, such as a private key, which can be verified by NVRAM controller 132 using a corresponding public key. If the agent's credential is verified, NVRAM controller 132 performs administrative actions to populate ACV table 158. In an alternative embodiment, ACV table 158 can be implemented by re-programmable ROM (e.g., electrically-erasable programmable ROM (EEPROM)), or other programmable hardware, and can be remotely programmed by an authorized server at system startup time. The authorized server may be controlled or owned by a manufacturer of computer system 100, a third-party authority, or any authority that holds the rights to configure ACV table 158. In one embodiment, a microcontroller (e.g., the ME) can send the credentials of the system to the authorized server via a network connection, and receive configuration data upon successful authentication. When computer system 100 boots for the first time, its BIOS can program ACV table 158 using the configuration data received from the authorized server.

Figure 2:
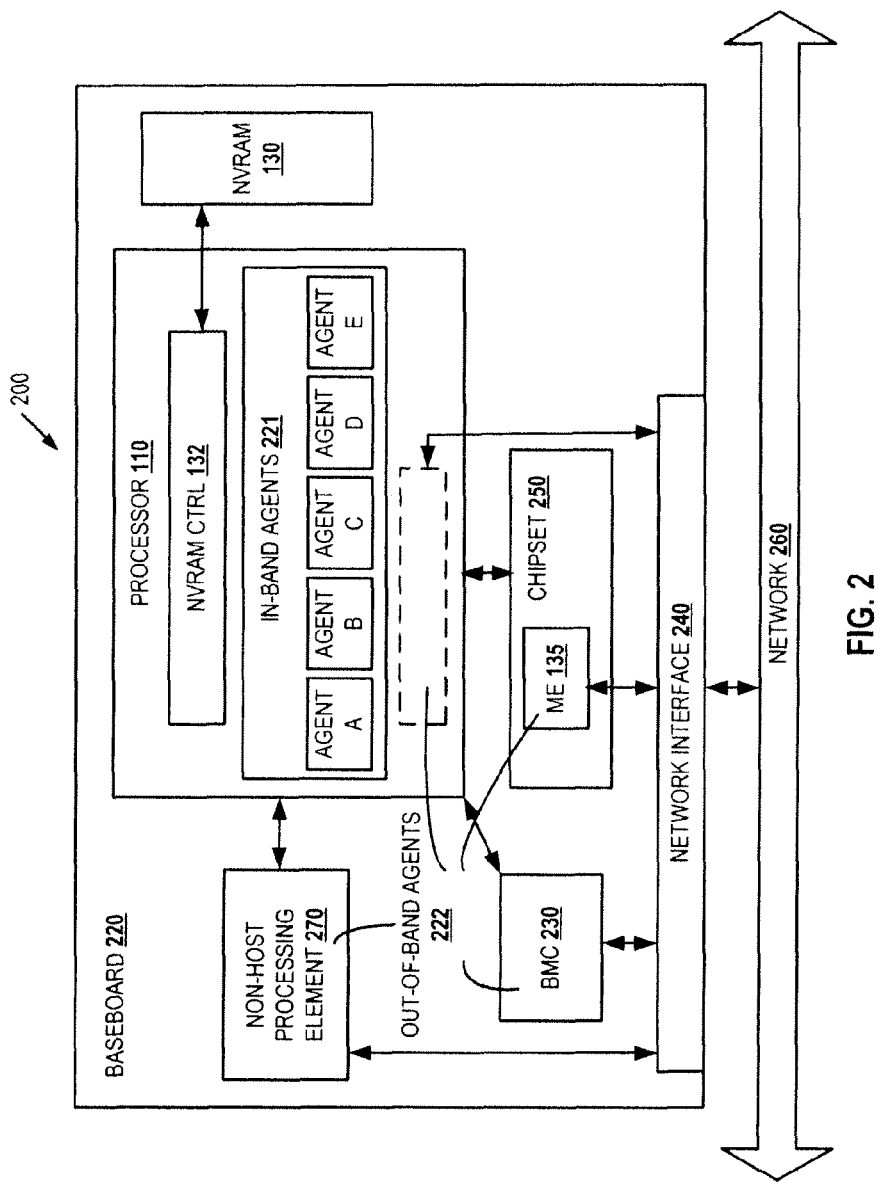
FIG. 2 illustrates a configuration of in-band and out-of-band agents in a computer system according to one embodiment of the invention.

FIG. 2 is a block diagram illustrating a configuration of in-band agents 221 and out-of-band agents 222 in a computer system 200 according to one embodiment of the invention. Computer system 200 includes a baseboard 220, on which a processor 110, NVRAM 130, and a chipset 250 are located. In-band agents 221 run on processor 110; that is, their operations are executed by the processor cores. In the embodiment of FIG. 2, in-band agents 221 include Agents A-E (e.g., core microcode, CPU/chipset state machines, boot firmware, BIOS, operating systems, hypervisors, user-domain processes/applications, OS guests, and system management mode (SMM) operations). In alternative embodiments, computer system 200 can include more or fewer in-band agents. Out-of-band agents 222 run on non-host processing elements (e.g., non-host processing element 270) that are coupled to processor 110. Out-of-band agents 222 can be located on baseboard 222 (e.g., the BMC 230), on chipset 250 (e.g., ME 135), and/or on processor 110 (e.g., the processor die or the CPU package). For example, in an alternative embodiment, the ME can be located in the CPU package in a system-on-a-chip (SOC) configuration. In one embodiment, out-of-band agents 222 can also include a plug-in module (e.g., a card) with a smart microcontroller using a serial interface (e.g., the platform environment control interface (PECI)) to communicate with the processor 110. Out-of-band agents 222 (and the microcontrollers on which they run) can be coupled to a network interface 240 for accessing to remote resources via a network 260.

Figure 3:
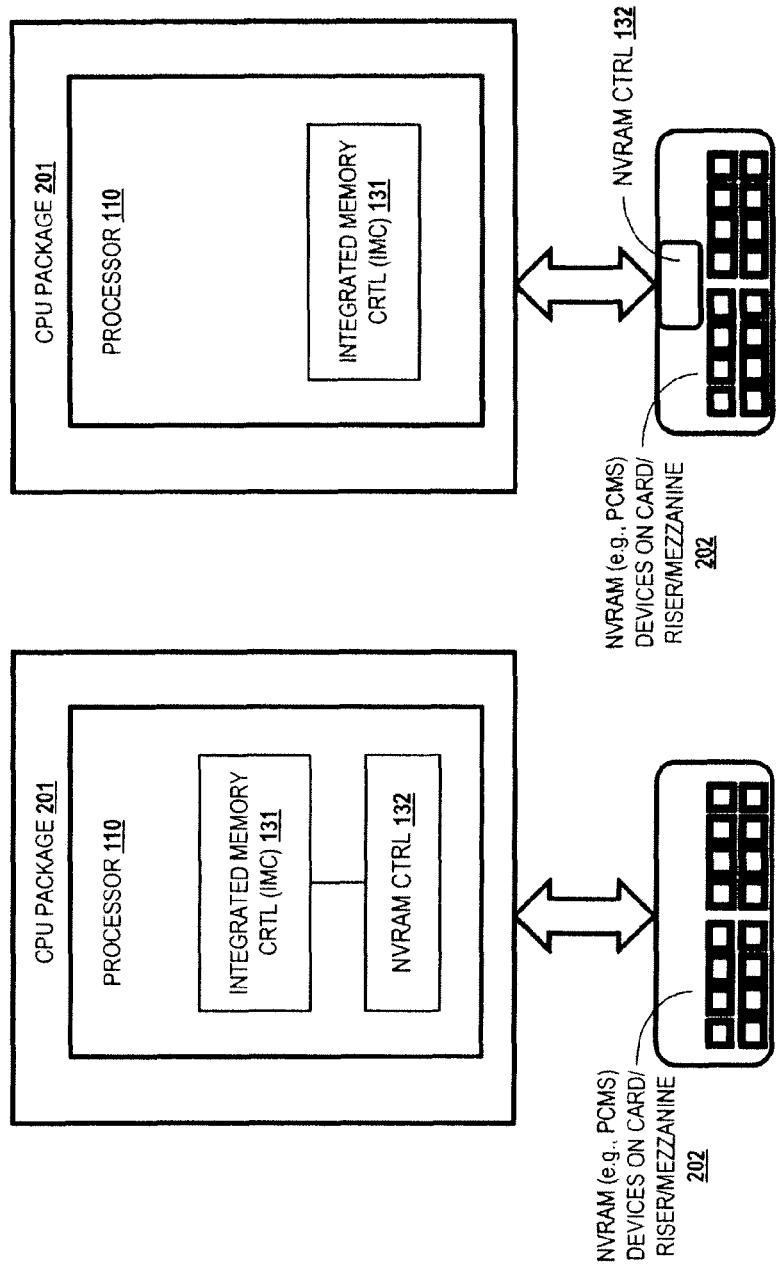
FIG. 3A illustrates an NVRAM controller on a central processing unit (CPU) package according to one embodiment of the invention.
FIG. 3B illustrates an NVRAM controller on a NVRAM card/riser/mezzanine according to an alternative embodiment of the invention.

In the embodiment of FIG. 2, NVRAM controller 132 is shown to be located on processor 110. In alternative embodiments, NVRAM controller 132 can be co-located with NVRAM 130 on a card/riser/mezzanine, as shown in FIG. 3B.

FIGS. 3A and 3B are block diagrams illustrating the location of NVRAM controller 132 in two alternative embodiments. FIG. 3A shows an embodiment in which NVRAM controller 132 is co-located with an integrated memory controller (IMC) 131 on the same die or package (referred to as the CPU package 201) as processor 110. NVRAM controller 132 can be connected to NVRAM 130 with a memory bus or other type of bus. For example, in one embodiment, the bus can be a memory bus (e.g., a DDR3, DDR4, etc.) over which NVRAM controller 132 implements a transactional protocol to communicate with NVRAM 130. NVRAM controller 132 may also communicate with NVRAM 130 over a bus supporting a native transactional protocol such as a PCI express (PCI-E) bus, desktop management interface (DMI) bus, or any other type of bus utilizing a transactional protocol.

In an alternative embodiment shown in FIG. 3B, NVRAM controller 132 may be located off-die or off-CPU package, coupled to processor 110 or CPU package 201 over a bus such as a memory bus (like a DDR bus (e.g., a DDR3, DDR4, etc)), a PCI express bus, a desktop management interface (DMI) bus, or any other type of bus. In one embodiment, NVRAM controller 132 can be located on the same physical modules (e.g., cards, risers, mezzanines, dual-in-line memory modules (DIMM), etc.) as NVRAM 130. In both embodiments, all access requests from in-band agents and out-of-band agents go through NVRAM controller 132 before a request for accessing NVRAM 130 can be granted. In some embodiment, NVRAM 130 can be coupled to processor 110 via a high-speed link that follows the same protocol as the inter-processor protocol (e.g., HyperTransport 3.0, Quick-Path Interconnect (QPI) 1.1 and its variants, and the like). In these embodiments, NVRAM controller 132 can communicate with NVRAM 130 using the protocols defined for these high-speed links.

Figure 4:
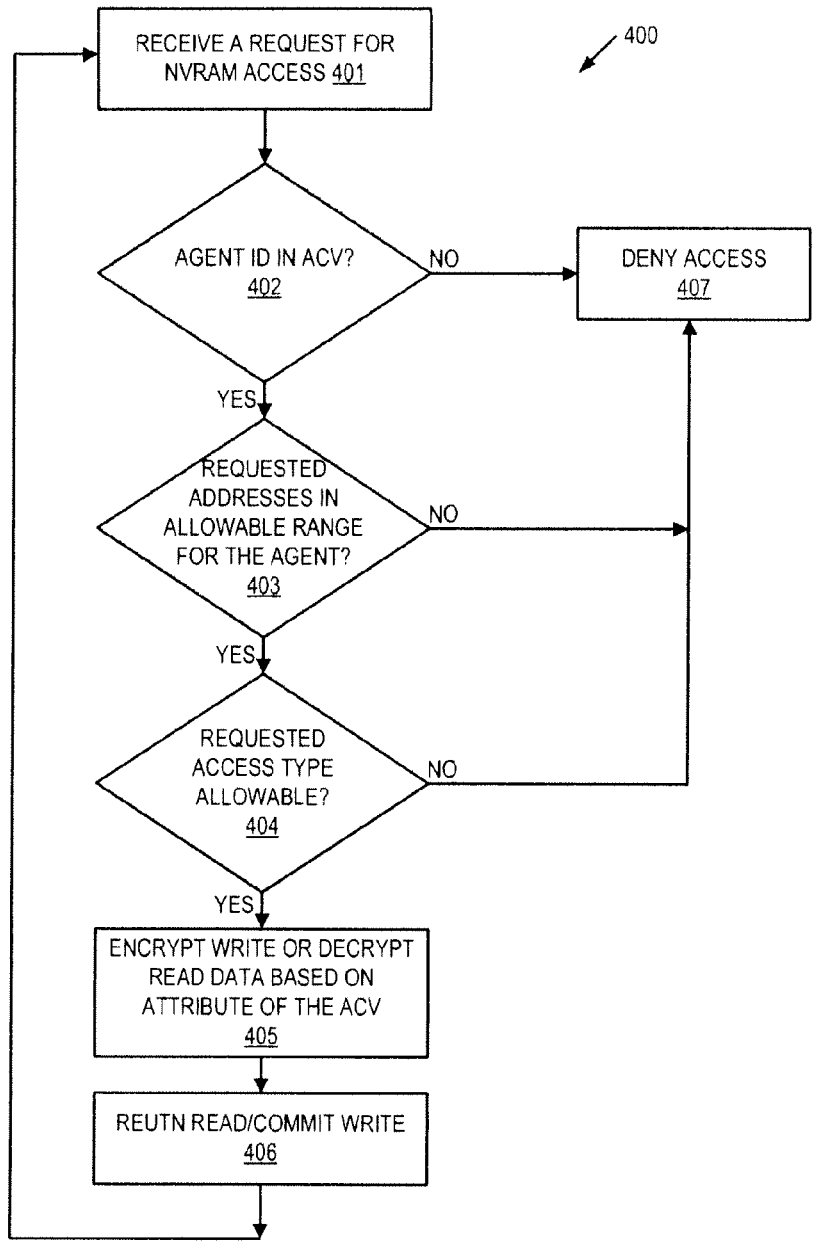
FIG. 4 illustrates a computer system in which embodiments of the invention may be implemented according to one embodiment of the invention.

FIG. 4 is a flow diagram illustrating a method 400 of access control according one embodiment of the invention. In one embodiment, NVRAM controller 132 receives an access request from one of the agents in a computer system (block 401). The access request indicates an agent identity, a requested address range to access, and the type of requested access (e.g., read, write, execute, etc.). NVRAM controller 132 first determines whether the requesting agent's identity matches a stored agent identity in ACV table 158 (block 402). The access request is denied if the agent identity cannot be found in ACV table 158 (block 407). Once an ACV is identified that has the requesting agent's identity, NVRAM controller 132 further determines whether the requested address range falls within the allowable range for the agent (block 403). The access request is denied if the requested address range does not fall within the allowable range (block 407). If the requested address range falls within the allowable range, NVRAM controller 132 determines whether the requested access type is allowed based on the attributes (e.g., readable, writable, executable, etc.) of the identified ACV (block 404). The access request is denied if the requested access type is not allowed (block 407). If the requested access type is allowed and it is a write access, NVRAM controller 132 determines whether encryption is necessary before the write operation based on the "encryption" attribute of the identified ACV. Similarly, if the requested access type is allowed and it is a read access, NVRAM controller 132 determines whether decryption is necessary after the requested data is read based on the "encryption" attribute of the identified ACV. If the encryption attribute is "Yes" (e.g., as indicated by a bit set to "1"), NVRAM controller 132 performs encryption on write or decryption on read (block 405). NVRAM controller 132 then performs the requested access (block 406), and the method 400 continues from block 401.

Figure 5:
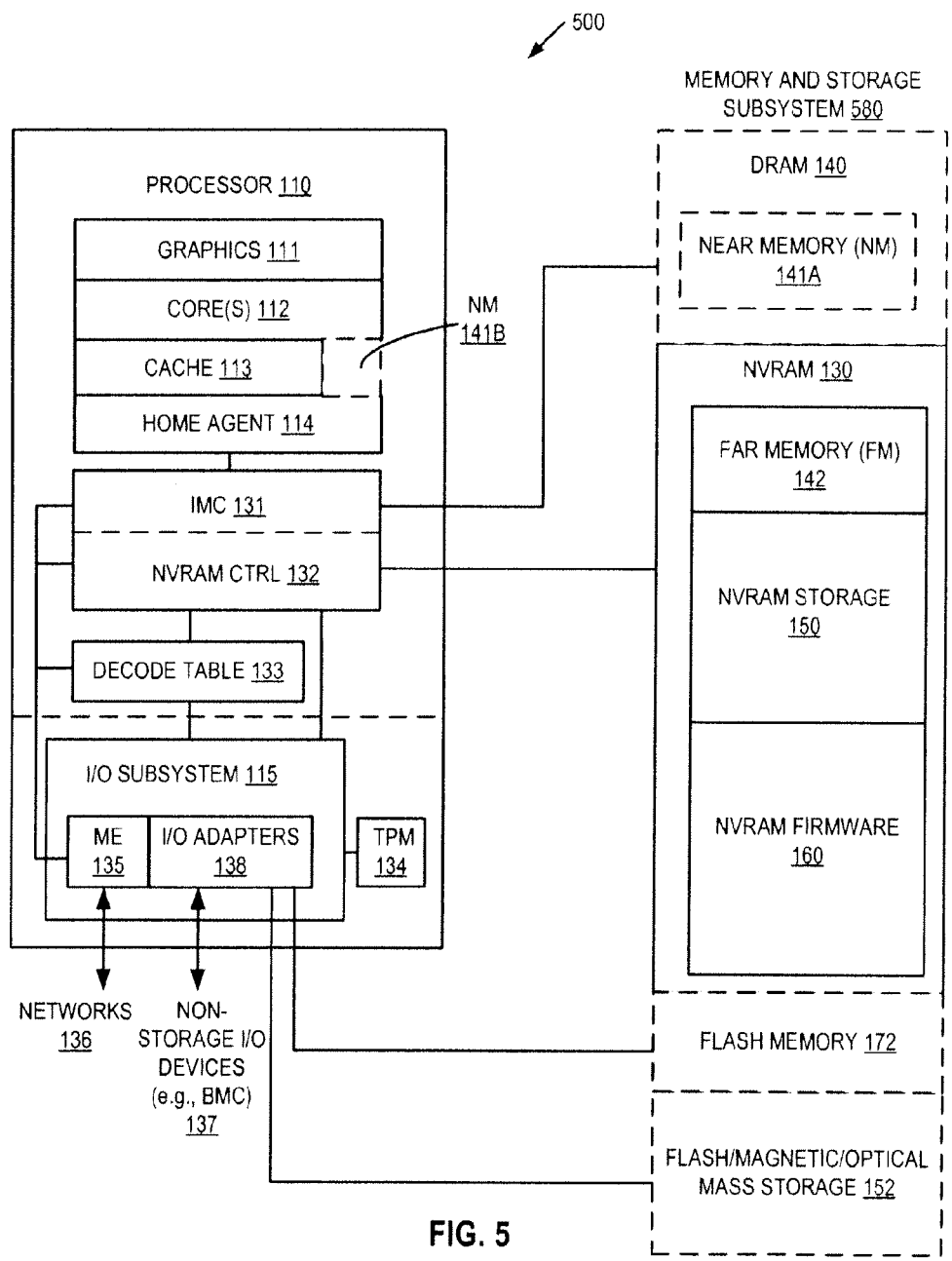
FIG. 5 is a flow diagram illustrating a method of access control for NVRAM according to one embodiment of the invention.

FIG. 5 is a block diagram illustrating a computer system 500 that uses byte-addressable NVRAM 130 in one or more tiers of the platform storage hierarchy. The term "platform storage hierarchy" herein refers to the entire storage media used by computer system 500 for storing data, instructions, states, and other persistent and non-persistent information. In one embodiment, all persistent storage in the computer system 500 can coalesce into one NVRAM 130 in a configurable fashion. In addition, some portion of NVRAM 130 can be apportioned as DRAM replacement for system memory. The versatility of NVRAM 130 facilitates technology migration from a conventional platform having an OS that operates on a persistent block-oriented file system, to an OS that understand a fully-persistent, byte-addressable, single-level data store.

In one embodiment, NVRAM 130 can be configured to implement the roles in a typical platform storage hierarchy as one or more of the following: cache, system memory (also known as main memory, primary memory, executable memory), storage (also known as secondary storage and mass storage), and firmware memory (such as boot memory (also known as BIOS flash), Trusted Platform Module (TPM) memory, and the like). Platform storage hierarchies with different roles are also contemplated and the application of NVRAM 130 is not limited to the roles described above.

NVRAM 130 is distinguishable from other instruction and data memory/storage technologies in terms of its characteristics and/or its application in the platform storage hierarchy. For example, NVRAM 130 is different from:
1) static random access memory (SRAM) applied as a cache dedicated to a processor core or shared by multiple processor cores;
2) higher speed memory (e.g., dynamic random access memory (DRAM)) applied as one or more caches internal to the processor (e.g., on the same die as the processor) and/or external to processor (e.g., on the same or a different package from the processor);
3) flash memory/magnetic disk/optical disc applied as drive storage; and memory such as flash memory or read only memory (ROM) applied as boot ROM.

NVRAM (e.g., NVRAM 130) in one embodiment of the invention has the following characteristics:

1) non-volatile (it maintains its content even if power is removed, similar to flash memory used in solid state disks (SSD), and different from SRAM and DRAM which are volatile);
2) lower power consumption than volatile memories such as SRAM and DRAM;
3) random access (also known as randomly addressable);
4) rewritable and erasable at a lower level of granularity (e.g., byte level) than flash found in SSDs (which can only be rewritten and erased a "block" at a time—minimally 64 Kbyte in size for NOR flash and 16 Kbyte for NAND flash);
5) usable as a system memory and allocated all or a portion of the system address space;
6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte); and
7) one or more of the following:
 (a) faster write speed than current non-volatile memory/ storage technologies (such as flash);
 (b) very high read speeds (faster than flash and near or equivalent to DRAM read speeds);
 (c) directly writable (rather than requiring erasing (overwriting with 1s) before writing data like flash memory used in SSDs); and/or
 (d) orders of magnitude (e.g., 2 or 3) higher write endurance before failure (more than boot ROM and flash used in SSDs).

As mentioned above, in contrast to flash memory, which must be rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM 130 is used as system memory, NVRAM may be accessed at the granularity of a cache line (e.g., a 64-byte or 128-byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by flash and the access size of the I/O subsystem's controller and bus.

NVRAM 130 may be used as instruction and data storage that has sufficiently short access time requirements to cause little impact on the processors. Here, program instructions and data may be loaded into NVRAM 130 from deeper, flash/magnetic/optical mass storage 152 prior to being executed by the processors. Moreover, as described in detail below, NVRAM 130 may be placed on a memory bus and may communicate directly with a memory controller that, in turn, communicates directly with the processors.

The presence of the new memory technology for NVRAM 130 provides for a wealth of new possibilities. Although discussed at much greater length further below, some of these possibilities are quickly highlighted immediately below.

According to one possible implementation, NVRAM 130 acts as a total replacement or supplement for traditional DRAM technology in system memory. In one embodiment, NVRAM 130 represents the introduction of a second-level system memory (e.g., system memory is as a combination of DRAM 140 and some or all of NVRAM 130). As such, the system memory may be viewed as having a near memory part NM 141A and a far memory part FM 142. It is appreciated that in different embodiments, a near memory can serve as a memory-side cache (e.g., near memory 141B acting as cache), a scratch pad, and other roles that are different from the system memory.

According to some embodiments, NVRAM 130 provides NVRAM storage 150, which acts as a total replacement or supplement for traditional mass storage, e.g., flash/magnetic/optical mass storage 152. The term "traditional mass storage" in the application refers to mass storage that is based on optical, magnetic and/or flash technology, such as disk and flash memory. For simplicity of the discussion, flash/magnetic/optical mass storage 152 is also referred to as traditional mass storage 152. Thus, the non-volatile mass storage for computing system 500 may be implemented using NVRAM, flash memory, magnetic storage, or any combination thereof. In an embodiment where NVRAM storage 150 acts as a total replacement for traditional mass storage 152, it is not necessary to use storage drivers for block-addressable storage access. The removal of storage driver overhead from storage access can increase access speed and save power. In alternative embodiments where it is desired that NVRAM storage 150 appears to the OS and/or applications as block-accessible and indistinguishable from traditional mass storage 152, emulated storage drivers can be used to expose block-accessible interfaces (e.g., Universal Serial Bus (USB) Bulk-Only Transfer (BOT) 1.0, Serial Advanced Technology Attachment (SATA) 3.0, and the like) to the software for accessing NVRAM storage 150. That is, the byte addressability of NVRAM 130 can be used by the storage driver to move blocks of NVRAM storage 150 and emulate block accessible mass storage without incurring the cost of I/O interfaces in these alternative embodiments.

According to some embodiments, NVRAM 130 provides firmware memory 160 (e.g., firmware memory for the BIOS, TPM 134, ME 135, etc.). Firmware memory 160 can act as a total replacement or supplement for firmware memory such as BIOS flash 162 and TPM flash 172. Firmware memory 160 is commonly implemented with flash technology and commonly stores the initial instructions (e.g., BIOS) executed by a processor to initialize key system components during a boot process. Firmware memory can also store system persistent states used by TPM 134 to protect sensitive system information (e.g., encryption keys). In one embodiment, the use of NVRAM 130 for firmware memory 160 removes the need for third party flash parts to store code and data that are critical to the system operations.

It should be understood that NVRAM 130 can include more or fewer partitions than what is shown in FIG. 5. The choice of memory and storage devices may depend on the type of platform on which the devices are used. For example, in a personal computer, tablet computer, notebook computer, mobile device (e.g., smartphone or PDA), the non-volatile mass storage may be implemented using NVRAM storage 150 alone, or using NVRAM storage 150 in combination with flash/magnetic storage. In other implementations (e.g., large-scale servers), the non-volatile mass storage may be implemented using magnetic storage (e.g., hard drives) or any combination of magnetic storage, flash, and NVRAM storage 150. In such a case, computer system hardware and/or software responsible for storage may implement various intelligent persistent storage allocation techniques to allocate blocks of persistent program code and data between the FM 142/NVRAM storage 150 and traditional mass storage 152 in an efficient or otherwise useful manner. In some embodiments, NVRAM 130 may become the sole memory/storage device off chip (i.e., off the processor chip). In some embodiments, instead of or in addition to the off-chip DRAM 140, DRAM 140 may be provided on chip as near memory; for example, as NM 141B acting as cache. These embodiments can be specifically relevant to very small platforms (e.g., smartphone or PDA), where multiple memory classes/technologies may be cost prohibitive and more transistors (including storage) can be placed on chip.

The NVRAM 130 may incorporate "wear leveling" algorithms to account for the fact that the storage cells at the far memory level begin to wear out after too many write accesses. Since high cycle count blocks are most likely to wear out in this manner, wear leveling spreads writes across the far memory cells by swapping addresses of high cycle count blocks with low cycle count blocks. Note that most address swapping is typically transparent to the end user because it is handled by hardware, software (e.g., a low level driver or operating system), or a combination.

In one embodiment, NVRAM 130 can be implemented with a non-volatile random access memory such as PCM or, more specifically, PCMS (also known as (PRAM or PCRAM), Ovonic Unified Memory (OUM), (CRAM). Other possible technology choices for far memory include, but are not limited to byte-addressable persistent memory (BPRAM), storage class memory (SCM), universal memory, Ge2Sb2Te5, Programmable metallization cell (PMC), Resistive memory (RRAM), RESET (amorphous) cell, SET (crystalline) cell, PCME, Ovshinsky, ferroelectric memory (also known as polymer memory and poly(N-vinylcarbazole)), ferromagnetic memory (also known as Spintronics, SPRAM (spin-transfer torque RAM), STRAM (spin tunneling RAM), Magnetoresistive, Magnetic memory, and Magnetic random access memory (MRAM)), and Semiconductor-oxide-nitride-oxide-semiconductor (SONOS, also know dielectric memory).

For convenience of explanation, the description herein sometimes refers to "PCM" or "PCMS" as the technology selection for NVRAM 130. As such, the terms NVRAM, PCM and PCMS may be used interchangeably. However it should be realized, as discussed above, that different technologies may also be utilized for NVRAM 130.

Continuing then with a discussion of the system of FIG. 4, in some embodiments, the architecture of computer system 500 may include multiple processors, although a single processor 110 is illustrated in FIG. 4 for simplicity. Processor 110 may be any type of data processor including a general purpose or special purpose central processing unit (CPU), an application-specific integrated circuit (ASIC) or a digital signal processor (DSP). For example, processor 110 may be a general-purpose processor, such as a Core™ i3, i5, i7, 2 Duo and Quad, Xeon™, or Itanium™ processor, all of which are available from Intel Corporation, of Santa Clara, Calif. Alternatively, processor 110 may be from another company, such as ARM Holdings, Ltd, of Sunnyvale, Calif., MIPS Technologies of Sunnyvale, Calif., etc. Processor 110 may be a special-purpose processor, such as, for example, a network or communication processor, compression engine, graphics processor, co-processor, embedded processor, or the like. Processor 110 may be implemented on one or more chips included within one or more packages. Processor 110 may be a part of and/or may be implemented on one or more substrates using any of a number of process technologies, such as, for example, BiCMOS, CMOS, or NMOS.

In one embodiment, the processor 110 includes an integrated graphics unit 111 which includes logic for executing graphics commands such as 3D or 2D graphics commands. While the embodiments of the invention are not limited to any particular integrated graphics unit 111, in one embodiment, the graphics unit 111 is capable of executing industry standard graphics commands such as those specified by the Open GL and/or Direct X application programming interfaces (APIs) (e.g., OpenGL 4.1 and Direct X 11).

Processor 110 may also include one or more cores 112, although a single core 112 is illustrated in FIG. 5, again, for the sake of clarity. In many embodiments, core 112 includes internal functional blocks such as one or more execution units, retirement units, a set of general purpose and specific registers, etc. If core 112 is multi-threaded or hyper-threaded, then each hardware thread may be considered as a "logical" core as well. The cores 112 may be homogenous or heterogeneous in terms of architecture and/or instruction set. For example, some of the cores may be in order while others are out-of-order. As another example, two or more of the cores may be capable of executing the same instruction set, while others may be capable of executing only a subset of that instruction set or a different instruction set.

Processor 110 may also include one or more caches, such as cache 113 which may be implemented as a SRAM and/or a DRAM. In many embodiments that are not shown, additional caches other than cache 113 are implemented so that multiple levels of cache exist between the execution units in the core(s) 112 and memory devices 141A and 142. For example, the set of shared cache units may include an upper-level cache, such as a level 1 (L1) cache, mid-level caches, such as level 2 (L2), level 3 (L3), level 4 (L4), or other levels of cache, a last level cache (LLC), and/or different combinations thereof. In different embodiments, cache 113 may be apportioned in different ways and may be one of many different sizes in different embodiments. For example, cache 113 may be an 8 megabyte (MB) cache, a 16 MB cache, etc. Additionally, in different embodiments the cache may be a direct mapped cache, a fully associative cache, a multi-way set-associative cache, or a cache with another type of mapping. In other embodiments that include multiple cores, cache 113 may include one large portion shared among all cores or may be divided into several separately functional slices (e.g., one slice for each core). Cache 113 may also include one portion shared among all cores and several other portions that are separate functional slices per core. In one embodiment, cache 113 may include a DRAM NM 141B acting as cache.

Processor 110 may also include a home agent 114 which includes those components coordinating and operating core (s) 112. The home agent unit 114 may include, for example, a power control unit (PCU) and a display unit. The PCU may be or include logic and components needed for regulating the power state of the core(s) 112 and the integrated graphics unit 111. The display unit is for driving one or more externally connected displays.

In some embodiments, processor 110 includes integrated memory controller (IMC) 131 to provide an interface for communicating with a memory and storage subsystem 580. More specifically, in one embodiment, IMC 131 contains logic necessary for reading from, writing to and refreshing DRAM 140. IMC 131 can be on the same chip as processor 110, or on a separate chip and/or package connected to processor 110.

In some embodiments, processor 110 is coupled to an I/O subsystem 115. I/O subsystem 115 enables communication between processor 110 and the following serial or parallel I/O devices: one or more networks 136 (such as a Local Area Network, Wide Area Network or the Internet), storage I/O device (such as flash/magnetic/optical mass storage 152, BIOS flash 162, TPM flash 172) and one or more non-storage I/O devices 137 (such as display, keyboard, speaker, base-board management controller (BMC), and the like). I/O subsystem 115 may include a platform controller hub (PCH) (not shown) that further includes several I/O adapters 138 and other I/O circuitry to provide access to the storage and non-storage I/O devices and networks. To accomplish this, I/O subsystem 115 may have at least one integrated I/O adapter 138 for each I/O protocol utilized. I/O subsystem 115 can be on the same chip as processor 110, or on a separate chip/ package connected to processor 110.

I/O adapters 138 translate a host communication protocol utilized within the processor 110 to a protocol compatible with particular I/O devices. For traditional mass storage 152, some of the protocols that I/O adapters 138 may translate include Peripheral Component Interconnect (PCI)-Express 3.0, Universal Serial Bus (USB) 3.0, Serial Advanced Technology Attachment (SATA) 3.0, Small Computer System Interface (SCSI), Redundant Array of Inexpensive Disks (RAID) and 1394 "Firewire," among others. For BIOS flash 162, some of the protocols that I/O adapters 138 may translate include Serial Peripheral Interface (SPI), Microwire, among others. Additionally, there may be one or more wireless protocol I/O adapters. Examples of wireless protocols are Bluetooth 4.0, IEEE 802.11-based wireless protocols, and cellular protocols, among others.

In some embodiments, I/O subsystem 115 also includes a Management Engine (ME) 135, which is a microprocessor (equivalently, a microcontroller) that allows a system administrator to monitor, maintain, update, upgrade, and repair computer system 500. In one embodiment, a system administrator can remotely configure computer system 500 through ME 135 via networks 136. In one embodiment, the configuration can be stored in a decode table 133 within processor 110. Decode table 133 can be read by IMC 131 and I/O subsystem 115, which then decide where a data access request from cores 112 should be directed.

In some embodiments, computer system 500 includes a Trusted Platform Module (TPM) 134 to control access to system persistent states, such as secure data, encryption keys, platform configuration information and the like. In one embodiment, these system persistent states can be stored in NVRAM firmware 160, which can be implemented with PCM-based memory such as PCMS.

In one embodiment, TPM 134 is a secure microcontroller with cryptographic functionalities. TPM 134 has a number of trust-related capabilities; e.g., a "seal" capability for ensuring that data protected by a TPM is only available for the same TPM. TPM 134 can protect data and keys (e.g., secrets) using its encryption capabilities. In one embodiment. TPM 134 has a unique and secret RSA key (which is generated based on the RSA algorithm developed by Ron Rivest, Adi Shamir and Leonard Adleman), which allows it to authenticate hardware devices and platforms. For example, TPM 134 can verify that a system seeking access to data stored in computer system 500 is the expected system. TPM 134 is also capable of reporting the integrity of the platform (e.g., computer system 500). This allows an external resource (e.g., a server on a network) to determine the trustworthiness of the platform but does not prevent access to the platform by the user.

In one embodiment, ME 135 and TPM 134 can be located on one or more chipsets off processor die but on the same CPU package (as shown with a dotted line separating I/O subsystem 115 from processor 110). This chipset configuration can be suitable for server platforms. In alternative embodiments, ME 135 and TPM 134 can be located within the processor die in a system-on-a-chip (SOC) configuration. The SOC configuration is suitable for mobile platforms and other portable systems.

It should be understood that a computer system can utilize NVRAM 130 for system memory, mass storage, firmware memory and/or other memory and storage purposes even though its processor does not have all of the above-described components of processor 110, or has more components than processor 110.

In one embodiment, computer system 500 includes NVRAM controller 132 to control data access to NVRAM 130, as described above in FIGS. 1-4. NVRAM controller 132 is coupled to IMC 131 and I/O subsystem 115. NVRAM controller 132 can read the configuration data from decode table 133, or alternatively, can rely on the decoding results passed from IMC 131 and I/O subsystem 115. In an embodiment where NVRAM 130 is implemented with PCMS, NVRAM controller 132 is a PCMS controller that performs byte-level access with protocols consistent with the PCMS technology.

Although IMC 131 and NVRAM controller 132 can be two discrete controllers (as shown in FIG. 5 with a dotted line separating the two controllers), in some embodiments these two controllers can be implemented as one combined controller to control the access to memory and storage. In alternative embodiments, NVRAM controller 132 can be co-located with NVRAM 130 (as shown in FIG. 3B) to control the access to the NVRAM memory cells. In these alternative embodiments, an NVRAM interface (not shown) can be provided on processor 110 to interface with NVRAM 130.

In some embodiments, NVRAM 130 may be the sole memory/storage device off chip (i.e., off the processor chip). In some embodiments, instead of the off-chip DRAM 140, DRAM may be used to provide an on-chip cache (e.g., NM 141B acting as cache). These embodiments can be specifically relevant to very small platforms (e.g., smartphone or PDA), where multiple memory classes/technologies may be cost prohibitive and more transistors (including storage) can be placed on chip.

It should be understood that the operations of the flow diagram FIG. 4 can be performed by the embodiment of FIGS. 1-3 and 5, as well as embodiments other than those shown in these figures. Additionally, the embodiments discussed with reference to FIGS. 1-3 and 5 can perform different operations than those discussed with reference to the flow diagram of FIG. 4.

The techniques shown in the flow diagrams of FIG. 4 can be implemented using instructions and data stored on non-transitory machine-readable or computer-readable media, such as non-transitory machine-readable or computer-readable storage media (e.g., magnetic disks; optical disks; random access memory; read-only memory; flash memory devices; and phase-change memory).

Embodiments of the invention may also be provided as a computer program product which may include a non-transitory machine-readable medium having stored thereon instructions which may be used to program a computer (or other electronic device) to perform a process. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
receiving, by a controller of a computer system, an access request from an out-of-band agent that runs on a non-host processing element to access a non-volatile random access memory (NVRAM), the NVRAM being byte-rewritable and byte-erasable, the NVRAM having stored thereon data to be used by a set of agents including in-band agents and the out-of-band agent, wherein the in-band agents run on a processor having one or more cores; and
determining, by the controller based on attributes associated with the out-of-band agent, which regions in the NVRAM are made available to the out-of-band agent, wherein a region made available to the out-of-band agent is also made available to at least one of the in-band agents, wherein the determining further includes the controller checking a table that stores respective data structures for the in-band agents and the out-of band agents, each respective data structure containing respective attributes for each of the agents, the table containing a data structure for the out-of-band agent that contains the attributes associated with the out-of-band agent, wherein, a higher privilege agent is permitted to configure the table and a lower privileged agent is not permitted to configure the table.

2. The method of claim 1, wherein the NVRAM comprises phase change memory (PCM).

3. The method of claim 1, further comprising:
wherein the table is an access control vector (ACV) table and the data structure is an ACV.

4. The method of claim 3, wherein each of the data structures has an attribute indicating whether a given NVRAM region that is accessible by one of the agents is sharable with another one of the agents.

5. The method of claim 1, further comprising:
encrypting data before writing the data into one of the regions if encryption is specified in one of the attributes.

6. The method of claim 1, further comprising:
the attributes being configured when the computer system starts up.

7. The method of claim 1, further comprising:
granting the out-of-band agent access to the one of the regions to resolve an error in the region that renders the at least one of the in-band agents inoperable.

8. An apparatus comprising;
one or more processing cores to execute operations of a plurality of in-band agents in a computer system;

a non-host processing element to execute operations of an out-or-band agent in the computer system;

a non-volatile random access memory (NVRAM) being byte-rewritable and byte-erasable, the NVRAM to store data to be used by a set of agents including the in-band agents and the out-of-band agent; and a controller coupled to the NVRAM to control access to the NVRAM by the agents, the controller to receive an access request from the out-of-band agent, and to determine, based on attributes associated with the out-of-band agent, which of a plurality of regions in the NVRAM are available to the out-of-band agent, wherein, it is permissible that a region made available to the out-of-band agent is also made available to at least one of the in-band agents, the controller to check a table, the table to store respective data structures for the in-band agents and the out-of band agents, each respective data structure containing respective attributes for each of the agents, the table to contain a data structure for the out-of-band agent that contains the attributes associated with the out-of-band agent, wherein, a higher privilege agent is permitted to configure the table and a lower privileged agent is not permitted to configure the table.

9. The apparatus of claim 8, wherein the NVRAM comprises phase change memory (PCM).

10. The apparatus of claim 8 wherein the table is an access control vector (ACV) table and the data structure is an ACV.

11. The apparatus of claim 10, wherein each of the data structures has an attribute that indicates whether a given NVRAM region is sharable.

12. The apparatus of claim 8, further comprising:
encryption logic to encrypt data before the data is written into a region made available to the out-of-band agent if encryption is specified in one of the attributes.

13. The apparatus of claim 8
wherein the table is configurable when the computer system starts up.

14. The apparatus of claim 8, wherein the non-host processing element includes a microcontroller that can operate independently of the processing cores.

15. An apparatus, comprising:
one or more processing cores to execute operations of a plurality of in-band agents in a computer system;
a non-host processing element to execute operations of an out-of-band agent in the computer system; and,
a controller to couple to a non-volatile random access memory (NVRAM), the NVRAM being byte-rewritable and byte-erasable, the NVRAM to store data to be used by a set of agents including the in-band agents and the out-of-band agent, the controller to control access to the NVRAM by the agents, the controller to receive an access request from the out-of-band agent, and to determine, based on attributes associated with the out-of-band agent, which of a plurality of regions in the NVRAM are available to the out-of-band agent, wherein it is permissible that a region made available to the out-of-band agent is made available to at least one of the in-band agents, the controller to check a table, the table to store respective data structures for the in-band agents and the out-of band agents, each respective data structure containing respective attributes for each of the agents, the table to contain a data structure for the out-of-band agent that contains the attributes associated with the out-of-band agent, wherein, a higher privilege agent is permitted to configure the table and a lower privileged agent is not permitted to configure the table.

16. The system of claim 15, wherein the NVRAM comprises phase change memory (PCM).

17. The system of claim 15 wherein the table is an access control vector (ACV) table and the data structure is an ACV.

18. The system of claim 17, wherein each of the data structures has an attribute that indicates whether a given NVRAM region is shareable.

19. The system of claim 15, further comprising:
encryption logic to encrypt data before the data is written into a region made available to the out-of-band agent if encryption is specified in one of the attributes.

20. The system of claim 15:
wherein the data structures are configurable when the computer system starts up.

21. The system of claim 15, wherein the non-host processing element includes a microcontroller that can operate independently of the one or more cores.

* * * * *